United States Patent [19]

Miller

[11] Patent Number: 4,824,025
[45] Date of Patent: Apr. 25, 1989

[54] ONE-PIECE IN-LINE PRESSURE COMPENSATING DRIP IRRIGATION EMITTER

[76] Inventor: David B. Miller, 6531 N. Teilman, Fresno, Calif. 93711

[21] Appl. No.: 54,468

[22] Filed: May 26, 1987

[51] Int. Cl.⁴ .............................................. B05B 1/30
[52] U.S. Cl. ................................ 239/542; 239/533.1; 239/547; 239/570; 138/43
[58] Field of Search ................ 239/542, 533.13, 533.1, 239/547, 570, 571; 138/37, 40, 42, 43

[56] References Cited

U.S. PATENT DOCUMENTS

| | | | |
|---|---|---|---|
| 3,856,333 | 12/1974 | Cox | 239/542 |
| 3,981,452 | 9/1976 | Eckstein | 239/542 |
| 4,022,384 | 5/1977 | Hoyle et al. | 239/542 |
| 4,215,822 | 8/1980 | Mehoudar | 239/542 |
| 4,627,573 | 12/1986 | Havens | 239/542 |
| 4,687,143 | 8/1987 | Gorney et al. | 239/542 |

Primary Examiner—Andres Kashnikow
Assistant Examiner—Christopher G. Trainor
Attorney, Agent, or Firm—Kimble, MacMichael & Upton

[57] ABSTRACT

A one-piece inline pressure compensating drip irrigation emitter unit comprising a regulator cylinder having an internal transversal channel member and one or more narrow trickle channels therein, the unit being disposed within a tubular fluid carrying conduit line or constituent parts thereof, provided with at least two orifices through which the line or constituent part communicates with the outside. The emitter unit provides for fluid output flow at a controlled, constant rate regardless of wide variations in the pressure of the fluid delivered to the emitter.

9 Claims, 4 Drawing Sheets

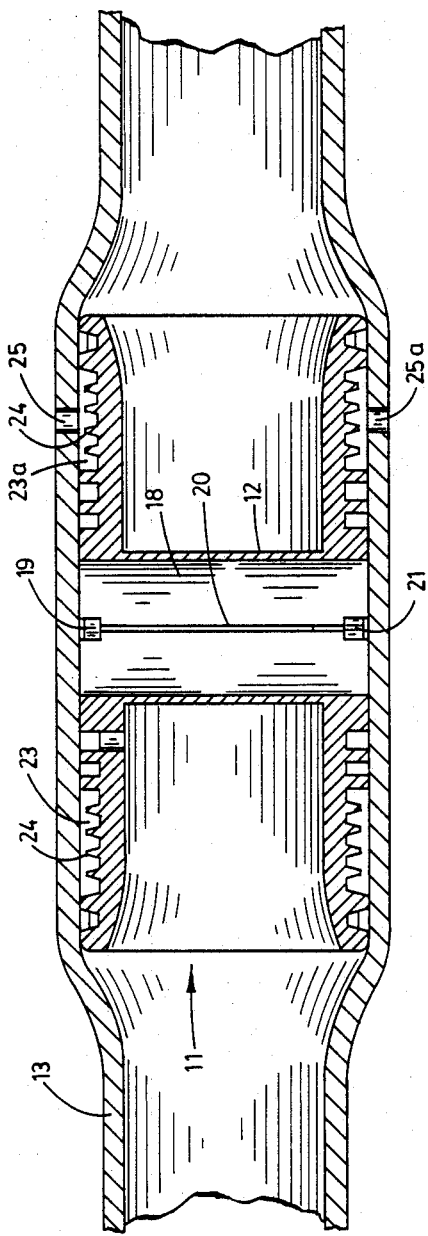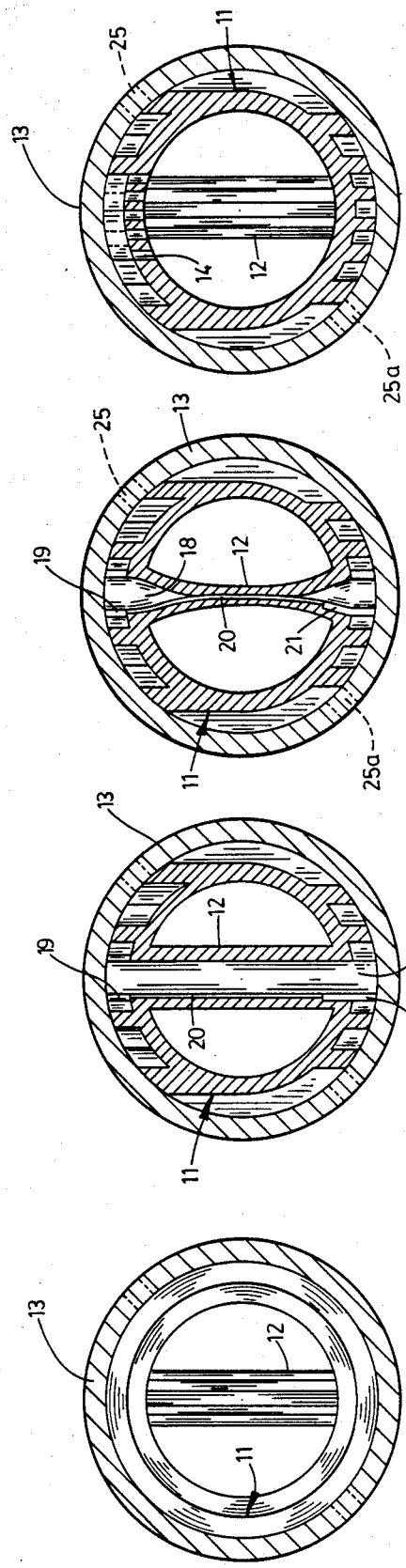

ONE-PIECE IN-LINE PRESSURE COMPENSATING DRIP IRRIGATION EMITTER

BACKGROUND OF THE INVENTION

1. Field of the Invention

The present invention relates to pressure compensating emitter for use in drip or trickle irrigation. More particularly, the invention relates to a one-piece in-line regulator of pressurized fluids which permits fluid output flow at a controlled, constant rate regardless of variations in the pressure of the fluid delivered to the emitter.

Drip or trickle irrigation has come to be recognized as a superior method of supplying water to plant life. Drip irrigation offers the advantages of using considerably less water than conventional irrigation methods, economizing in water expenditure while minimizing water waste. Drip irrigation allows water to be applied to a precise area so as to minimize weed growth while maximizing cultivation and avoiding compaction of wetted soil.

There has developed a need for drip irrigation systems which are economical to manufacture, install, maintain and store; which offer long-term reliability; and which remain consistently operable over wide ranges of topographical and soil conditions, despite variances in fluid pressure within the irrigation system itself. One of the most important functions of an irrigation emitter is to compensate for variations and fluctuations in the pressure of the fluid delivered to the emitter so as to provide a constant, steady rate of flow from the emitter to the point where it is actually needed by the plants or cultures to be irrigated.

2. Description of Related Art

Numerous drip irrigation emitters, restrictors and valves are known in the art. Among these are flow control valves having collapsible open-ended flange assemblies or "flappers" which open directly to the fluid in the irrigation system, such as those disclosed in U.S. Pat. Nos. 4,113,180 and 3,779,468. Unfortunately, these flapper-type emitters are not well suited for lengthy irrigation systems such as those used for row crops. By their very nature "flapper" emitters go to a flush mode when low fluid system pressures are delivered to them. Increased pressure is required to bring these emitters from flush mode to drip or trickle mode. When a large number of such emitters is placed in a fluid system, an extremely high initial pressure is required throughout the entire system to change the emitters from flush mode to drip mode. All of the emitters change modes at once when this high pressure crossover point is reached. The longer the irrigation system, the greater the number of emitters and the higher the crossover pressure required. Unless this crossover pressure is delivered, none of the "flapper" emitters will change from flush to drip mode. It is for this reason that "flappers" emitters are seldom used in the lengthy irrigation systems used for row crops.

Flapper emitter are generally attached to the outside of a conduit line as opposed to being placed inside. For this reason, they also suffer from the disadvantage of the risk of popping free from the conduit line under high pressure, or breaking off of the conduit line in harsh exterior environments, such as when the irrigation line is rolled in and out of a field.

Irrigation systems employing flapper emitter must utilize conduit lines with increased thickness and strength in order to hold the external flapper emitters in place on the conduit line without popping free or leaking in the vicinity of the emitter.

Other emitters known in the art are placed within the conduit line of the irrigation system itself. However, many of these in-line emitters, such as that disclosed in U.S. Pat. No. 4,210,287 may block a considerable portion of the interior of the conduit line, depending on the size of the emitter and the diameter of the conduit line. The narrower the conduit line used, the more such a line may be blocked by emitters of these types. Others, such as U.S. Pat. No. 4,254,791 greatly restrict the interior diameter of the conduit line. Both of these emitters suffer from the disadvantage of increased friction in the vicinity of the emitter. This friction lowers the pressure of the fluid passing through the emitter. With multiple-emitter systems, the accumulated effect of this pressure loss results in a corresponding decrease in overall system fluid pressure.

Many in-line emitters known in the art, such as that described in U.S. Pat. No. 4,307,841 must be constructed out of a combination of two materials in order to properly function. One of these is a substantially rigid thermoplastic material. The rigidity of such emitters makes it difficult to coil up, flatten, store or ship the conduit line into which they have been extruded. In addition, it is essential for emitters of this type to be attached to one side of the interior wall of the conduit line. If there is poor bonding between the emitter and the conduit line, the emitter may break loose under fluid pressure, blocking the conduit line and allowing excess fluid to escape from the opening of the dislocated emitter in the line. Coiling and uncoiling lines containing such emitters may serve to weaken the bonds between the emitters and the line, further increasing the risk of emitters breaking loose as described above.

The emitters discussed above also suffer from the problems inherent in a construction utilizing multiple parts. Such emitters are not easily assembled and require an expensive labor-intensive or a costly automated process to be manufactured. Because of the labor and assembly required, production of emitters with consistent characteristics is difficult giving rise to the need for quality assurance checks in the manufacturing process. Once installed in a fluid flow system, such emitters are subject to increased failure rates which are directly related to the number of parts in the emitter. All of these problems increase the cost of both manufacturing and using these types of emitters.

The emitter disclosed in the art generally utilize a single output orifice through the conduit line leading from the emitter to the outside environment. Some, such as U.S. Pat. No. 4,254,791 allow for multiple apertures from the fluid flow leading to a single output orifice. Emitters of this type suffer from the problems of clogging or discharge variance when placed on or below the surface of the soil. When the flow of fluid through an irrigation system equipped with emitters having single output orifices is discontinued, a backflow or vacuum condition is created within the fluid system, reversing the pressure delivered to the emitter. This results in a suction at each of the output orifices of the emitters. If the output orifices of such emitters are disposed directly against the soil under these conditions, there is a great likelihood that particles of soil or other matter will be sucked directly into the emitter orifices either partially or completely clogging them.

The intake of particular matter under backflow conditions, or the presence of particles in the fluid in the system disclose another potential drawback in emitters such as that described in U.S. Pat. No. 4,307,841. The theory of operation for such emitters involves a pressure within the fluid system acting against a flexible membrane which presses against a piece of rigid thermoplastic material. A small groove carved in the rigid material leading to a output orifice provides the mechanism for restricting output flow. However, if particles of soil or other matter become entrapped between a flexible membrane and the rigid thermoplastic material, complete restriction is not possible, resulting in increased flow rates regardless of the amount of pressure exerted by the fluid within the system on the flexible membrane. Emitters of this type are particularly susceptible to distorted flow rates because of the suction of particulate matter into the output regions during backflow or vacuum conditions.

The placement and size of the output orifices in emitters such as U.S. Pat. No. 4,254,791 is extremely crucial. Unless the orifice is placed in a precise location, the desired flow rate control will not be achieved. Likewise, unless the orifice is of a precise size and dimension, the action of the emitter in the vicinity of the orifice may lead to unpredictable results, and flow rate control will be lost.

SUMMARY OF THE INVENTION

It is an object of the present invention to substantially overcome the draw-backs and difficulties detailed above by providing a flexible one-piece inline series-connectable pressure compensating drip irrigation emitter displaced within a conduit line having an internally bisecting transversal member having a narrow trickle channel therethrough, the exterior surface of such transversal member being exposed to the flow of fluid within the fluid system. The emitter may be heat bonded to the internal circumferential surface of a conduit line at pre-determined spaced intervals, a passage being formed between the outer wall of the emitter and the inner wall of the conduit, the flow of fluid being conducted in axial stretches of said passage first in to and fro directions intermediate the ends of the emitter, the said axial stretches of passage being provided with a labyrinth of crosswise extending ribs or protrusions which cause the flow within these stretches to perform bows and bends through a tortuous or meandering path, the flow of fluid then being conducted through said narrow trickle channel within the transversal member to a second set of passages between the outer wall of the emitter and the inner wall of the conduit, leading to an annular output region defined by a series of gapped annular ribs around which may be found a plurality of orifices in the conduit line which communicate with the exterior environment.

It is an object of the present invention to provide an emitter of the type described above which provides fluid output flow at a controlled, constant rate irrespective of topographical conditions, or variations in the pressure of the fluid delivered to the emitter. This object the invention achieves by providing an emitter of the type described above having a transversal pressure regulating means exposed to the pressure prevailing in the fluid system, its displacement in accordance with the prevailing pressure in the system serves to introduce a flow resistance which varies in accordance with pressure variations within the system, ensuring that the emitter output rate is maintained substantially stable. Fluid pressure control is provided by the present invention, via the flow restricting flowpath established within the emitter.

It as an object of the present invention to provide an emitter of the type described above which may be used in irrigation systems having conduit lines of considerable length. This object is achieved by providing a pressure compensating emitter which provides a constant drip output fluid flow at a very low initial fluid system pressure which is disposed within the conduit line in such a way as to maintain a consistent interior diameter of the circumferential wall within the conduit line, minimizing any friction within the line in the vicinity of the emitter in order to maintain a high and consistent pressure throughout the fluid system. The present invention may be made in various sizes so as to achieve this same friction minimizing effect regardless of the diameter or circumference of the conduit line into which it is inserted.

It as an object of the present invention to provide an emitter of the type described above which is relatively insensitive to topographical variations.

It as an object of the present invention to provide an in-line emitter of the type described above which is composed of a resilient flexible elastic or other similar material allowing the conduit carrying such emitters to be easily coiled, uncoiled, flattened, stored or shipped without the risk that the emitters contained therein will break free of the conduit line.

It as an object of the present invention to provide an in-line emitter of the type described above having no exterior projections or protrusions otherwise subject to displacement or damage.

It as an object of the present invention to provide an emitter of the type described above having a plurality of exit orifices in the conduit at the emitter regions so as to allow air re-entering the system under backflow or vacuum conditions to naturally select a path of least resistance from among the alternative openings so as to minimize the possibility of blockage of the exit orifices. Reintroduction of pressure to the system easily flushes all orifices clear.

It is an object of the present invention to provide an emitter of the type described above which does not require precise placement or size of exit orifices in the conduit line in order to achieve consistent flow rate control.

It is an object of the present invention to provide an emitter of the type described above which does not require a specific orientation within the conduit line, but may be placed therein either forwards or backwards and still achieve consistent flow rate control.

It is an object of the present invention to provide an emitter of the type described above which prevents flow restriction at the exit orifices in the conduit by providing a plurality of annular ribs in the emitter at the regions immediately adjacent to such orifices, which prevent collapsing of these pressure-sensitive regions of the emitter against the interior wall of the conduit line. Gaps are provided in the annular ribs to allow the flow of fluid across the ribs to the exit orifices.

An important object of the invention is the provision of an improved emitter of the type described above in which fluid flowing in a system is reduced to a uniform flow at a lower pressure by automatic restriction of the trickle channel areas of the interior of a transversal member, the exterior of which is exposed to the fluid flow within the conduit line, in response to fluctuations in pressure on the surface of the transversal member intermediate its ends.

It as an object of the present invention to provide an emitter of the type described above composed entirely of a single piece of flexible elastic or other similar material which is simple in construction, economical in cost, efficient in operation, and economical in manufacturing; which requires little or no quality control in manufacturing; which requires no assembly other than extrusion into a conduit line; which provides consistent and predictable output flow characteristics over wide temperature and pressure ranges; which requires minimal maintenance, repair or replacement; which has a maximum useful life; and which is subject to a minimum failure rate once installed.

BRIEF DESCRIPTION OF THE DRAWINGS

FIG. 5. is a transverse sectional view taken through 5—5 of FIG. 1.

FIG. 6. is a transverse sectional view taken through 6—6 of FIG. 1.

FIG. 6A. is a transverse sectional view taken through 6—6 of FIG. 1, showing the action of the emitter when fluid pressure is applied in the conduit line.

FIG. 7 is a transverse sectional view taken through 7—7 of FIG. 1.

FIG. 8. is a longitudinal sectional view taken through 8—8 of FIG. 1.

DESCRIPTION OF THE PREFERRED EMBODIMENT

No attempt is made to show structural details of the invention in more detail than is necessary for a fundamental understanding of the invention, the description taken with the drawings making apparent to those skilled in the art how the several forms of the invention may be embodied in practice.

Figure 9:
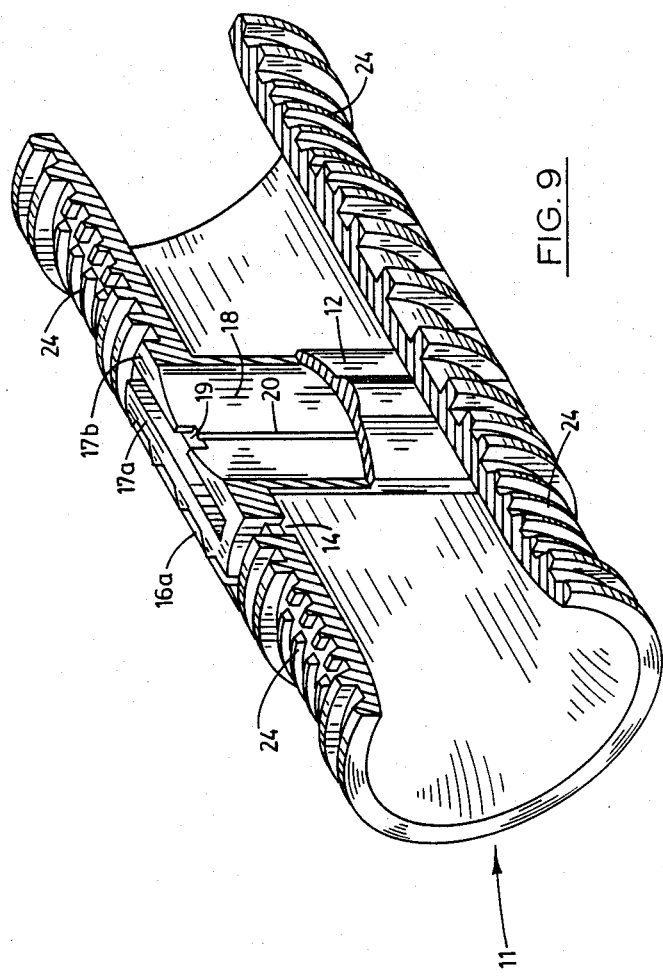
FIG. 9. is a perspective cutaway view of an emitter of the type described herein.

Referring to the drawings wherein like reference characters designate like or corresponding parts throughout the several views, and referring particularly to FIG. 9, it is seen that the invention comprises a cylindrical one-piece emitter unit 11 having a hollow transversal member 12 which axially bisects the smooth internal circumferential area defined by the cylindrical emitter unit. The interior surface of said transversal member 12 is irregular so as to define at least one trickle channel 20 therein. As seen in FIG. 8, the unit 11 itself is fixedly disposed within a tubular, fluid carrying conduit line 13 by friction or other retaining means in such a way as to define, in conjunction with the conduit line 13 a flow path for fluid to escape from within the conduit line to the outside. The entire emitter unit 11 including the transversal member 12 is made of a single piece of flexible rubber or other material having similar elastic properties.

The internal diameter of the unit 11 is approximately equal to that of the inside of the conduit line 13 into which it is placed. The emitter unit 11 is constituted by a plurality of inlet openings 14 which provide communication from the inside of the conduit line 13 to the flow path as defined by the invention herein.

Figure 1:
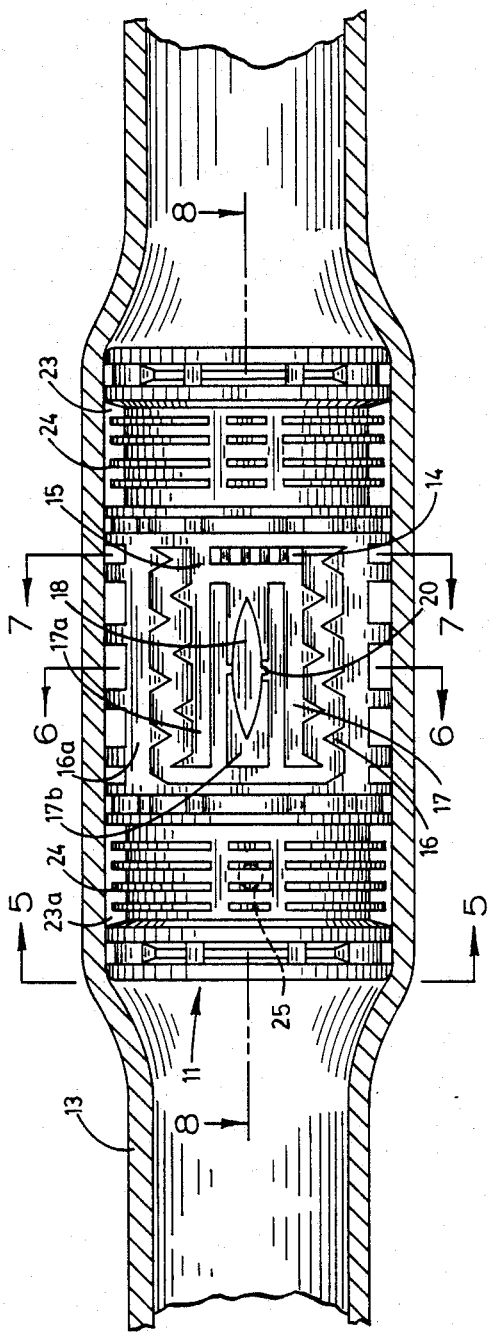
FIG. 1. is a cut away obverse view of a longitudinal section of an irrigation conduit line containing an emitter unit of the type described herein.

Reference is made to FIG. 1 wherein it is seen that the unit provides a series of zigzagging deflection means 16 and 16a defined in conjunction with the conduit line immediately adjacent to said inlet openings 14. An optional blockage piece 15 may be employed at one end of the inlet openings 14 to restrict the flowpath into the deflection region defined by deflection means 16. Piece 15 may be removed to create dual flowpaths through both regions defined by deflection means 16 and 16a. A series of walls 17, 17a, and 17b adjacent to 16 and 16a, respectively, define pathways from the inlet openings 14 to the large opening 18 and 19 of the transversal member 12 [see also FIG. 8 and FIG. 9].

Reference is made to FIG. 8 where an opening area 19 is defined at the entrance to the transversal member which connects the pathways defined by walls 17, 17a and 17b to the irregular interior surface of transversal member 12 which define at least one trickle channel for the flow of fluid along the interior edges of the transversal member 12. these trickle channels 20 communicate to the opposite side of the unit to an opening 21 defined in transversal member 12.

Figure 2:
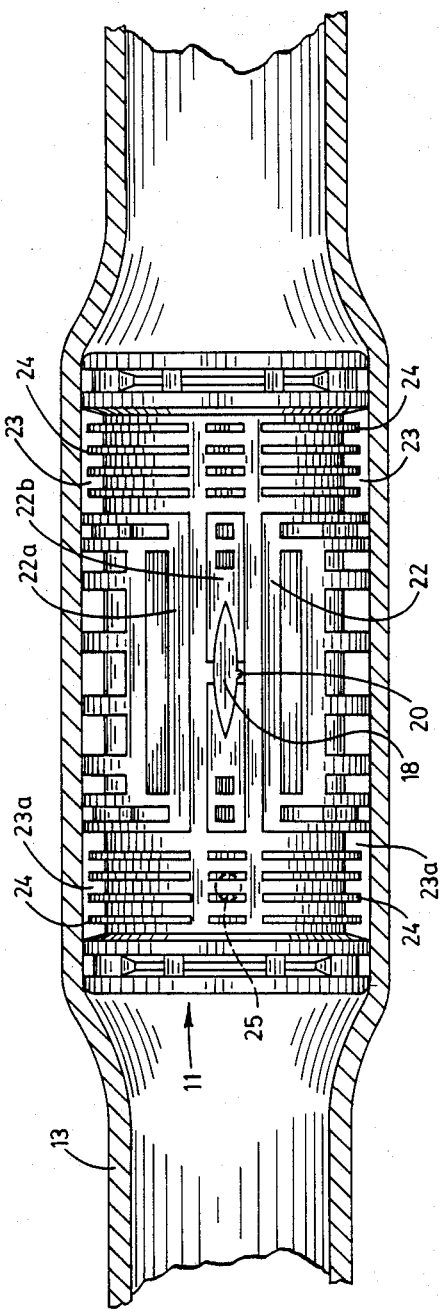
FIG. 2. is a cut away reverse view of a longitudinal section of an irrigation conduit line containing an emitter unit of the type described herein.
Figure 3:
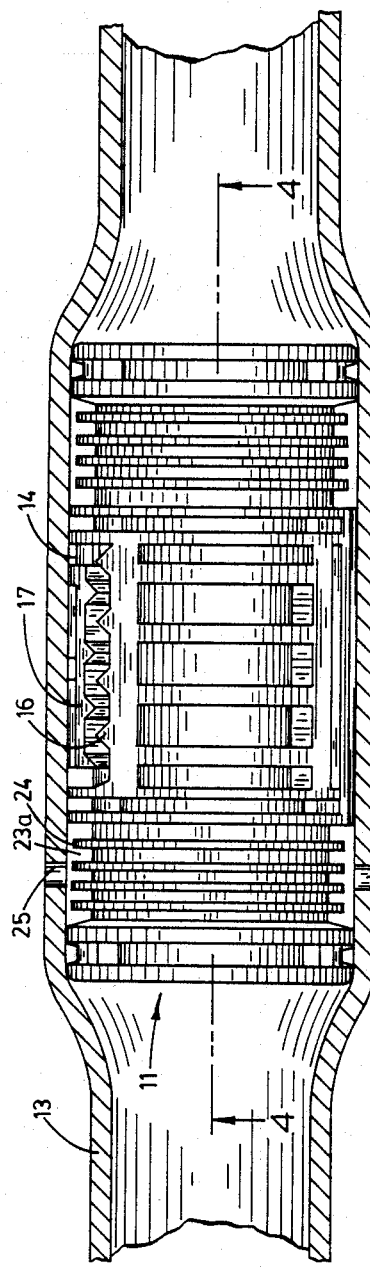
FIG. 3. is a cut away side view of a longitudinal section of an irrigation conduit line containing an emitter unit of the type described herein.

Reference is made to FIG. 2 where it is seen that the large opening 18 defined within the transversal member 12 connect to a series of walls 22, 22a and 22b which define pathways between the large opening 18 to the annular output spaces 23 and 23a located at either end of the emitter. The output spaces 23 and 23a are defined by a plurality of annular ribs 24 having gaps therein which provide a continuous and uninterrupted extension of the pathways defined by walls 22, 22a and 22b.

The annular output spaces 23 and 23a communicate with the outside environment via at least two openings 25 and 25a placed in the conduit line 13 in the vicinity of the annular ribs 24. As shown in FIG. 6, there openings may be placed at any location in the conduit line 13 so long as they are adjacent to some portion of the annular output spaces 23 and 23a.

Figure 4:
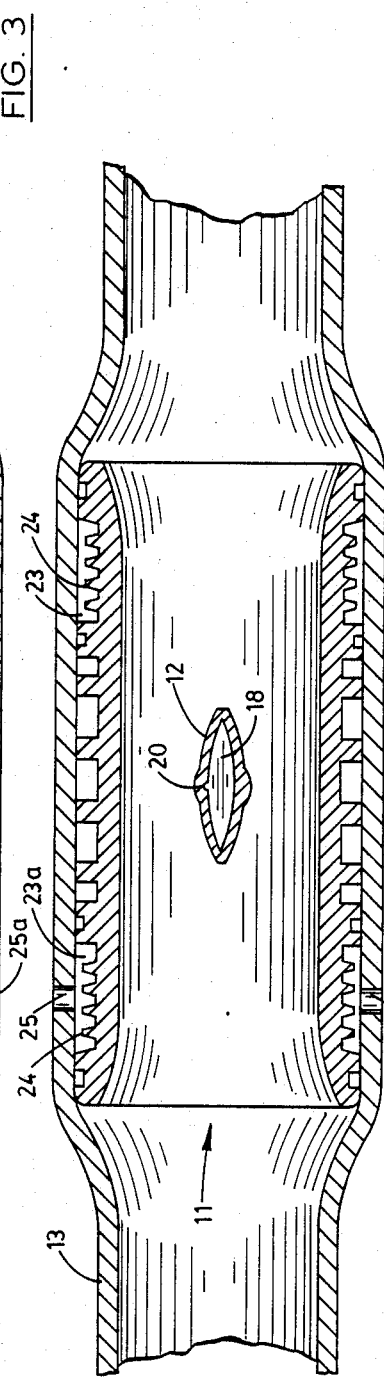
FIG. 4. is a longitudinal sectional view taken through 4—4 of FIG. 3.
Figure 4A:
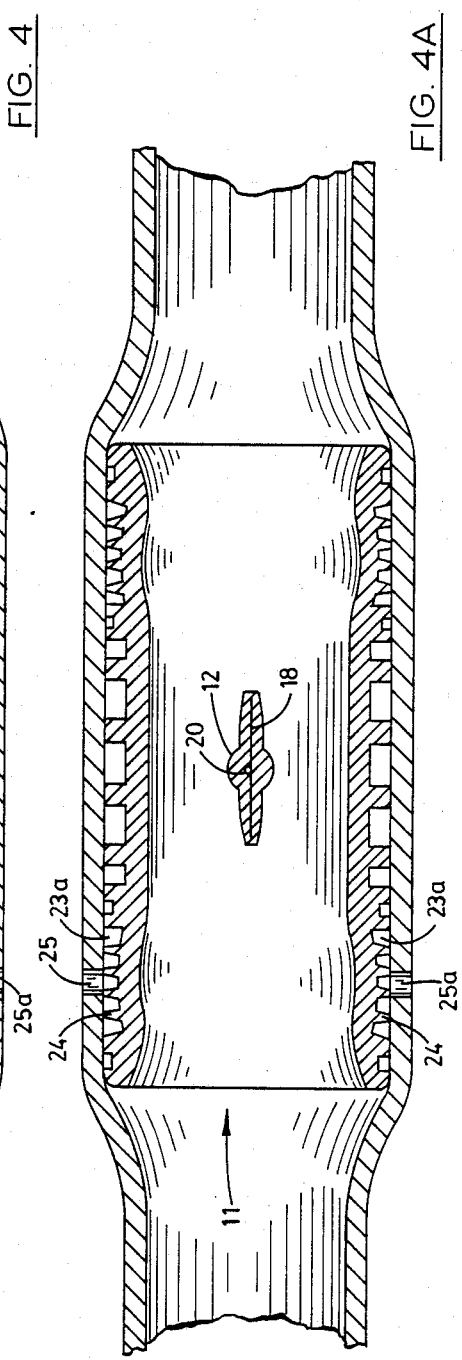
FIG. 4A. is a longitudinal sectional view taken through 4—4 of FIG. 3 showing the action of the emitter when fluid pressure is applied in the conduit line.

In operation, the one-piece in-line pressure-compensating drip irrigation emitter unit according to the invention functions as follows: The fluid, e.g. water, flows through the conduit line 13 until it reaches the inlet opening 14 where it enters the emitter. The fluid zigzags through the deflection area defined by deflection means 16 (and 16a if piece 15 is removed). The zigzagging motion of the fluid around the deflection means 16 (and 16a) causes turbulence in the flow resulting in a reduction of fluid pressure. The fluid now having reduced pressure passes through the pathways defined by walls 17 (and 17a if piece 15 is removed) and 17b until it reaches the openings 18 and 19 of the transversal member. The pressure of the fluid within the conduit line is greater than the pressure of the fluid having passed through the zigzagging regions of the emitter which has not reached openings 18 and 19 of the transversal member. This difference in fluid pressure causes the flexible transversal member to collapse against itself as shown in FIG. 6A closing the wide opening 18 as shown in FIG. 4A. This collapsing action further restricts the trickle channels 20 in direct relation to the differential of the pressure of the fluid within the system exerted upon the surface of the transversal member 12, and the pressure of the fluid coming from the regions defined by walls 17 and 17a into the trickle channels 20 of the transversal member. As a result of this collapsing action, only a portion of the trickle channels 20 are available to conduct fluid through the transversal member to the opposite side of the emitter unit. This restrictive action varies directly with the pressure of the fluid within the system, compensating for changes in said fluid pressure, and hence providing for a constant rate of flow through the trickle channel within the transversal member at variable system fluid pressures.

Figure 10:
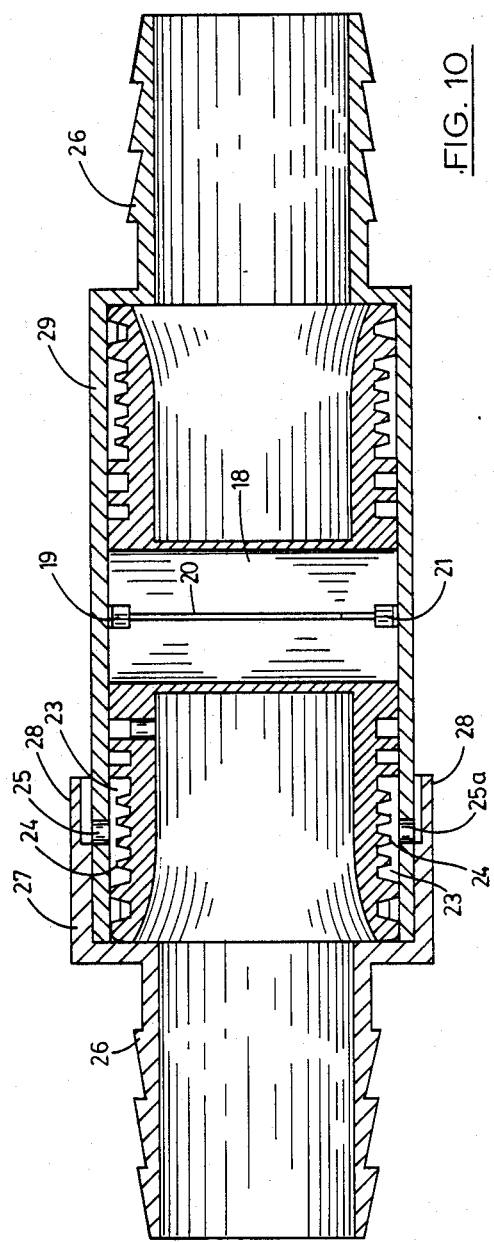
FIG. 10. is a cross-sectional view of yet another embodiment of the emitter of the type described herein.

The flow of fluid leaving the transversal member at area 21 follows a pair of pathways defined by walls 22, 22a and 22b which lead to annular output regions 23 and 23a on opposite ends of the emitter. The fluid flows into both of the annular out regions, eventually reaching output orifices 25 and 25a which may be placed over annular output regions 23, 23a, or both. Annular ribs 24 having gaps therein provide a means to prevent the emitter 11 from collapsing against the conduit line 13 in the vicinity of the output orifices 25 and 25a which have been cut into the conduit line (see FIG. 4A). The flow of fluid passing through the trickle channel within the transversal member into the pathways defined by walls 22, 22a and 22b is greatly reduced by the time it reaches annular output regions 23 and 23a. As a result, the fluid flows at a drip or trickle rate through the output orifices 25 and 25a. The rate of this fluid flow is directly related to all of the following: (a) the length, size, shape and number of zigzagging regions 16 and 16a; (b) the size and the number of trickel channels 20; and (c) the flexibility of the member, are composed. Each of these three regulating factors may be modified either independently or in conjunction with one another in order to provide the desired flow rate from the emitter. Once these parameters are selected, the emitter will provide a constant flow rate over a wide range of fluid system pressures. Reference is made to FIG. 10 which depicts a cross-sectional view of a different embodiment of the emitter. In this embodiment, the emitter 11 is permanently attached to an inner coaxial member 29 having a pair of orifices 25 and 25a positioned above the annular output spaces 23 and ribs 24. The inner coaxial member 29 has a coupling piece 26 on one end which allows for insertion into a conduit line such as 13. The inner coaxial member 29 fits into an outer coaxial member 27 as shown in FIG. 10. The outer coaxial member also has a coupling piece 26 on one end to allow for insertion into a conduit line. An annular lip region 28 is defined in the outer coupling member above output orifices 25 and 25a so as to allow communication of fluid from the annular output spaces 23 to the outside environment. The lip region 28 also acts as a guard shield to prevent dirt or other materials from clogging the orifices 25 and 25a.

In the preferred embodiment, the invention provides a one-piece in-line pressure compensating drip irrigation emitter unit comprising a regulator cylinder having an internal transversal channel member, disposed within a tubular, fluid-carrying conduit line or in constituent parts thereof, provided with at least two orifices through which said line or constituent part communicates with the outside, which emitter is constituted by a cylinder having an internal diameter approximately equal to that of the inside of the conduit line into which it is placed so as to allow for the free flow of that portion of fluid which does not enter the emitter, such cylinder having a plurality of inlets allowing fluid to flow into the peripheral area of the cylinder defined between the cylinder itself and the inside wall of the conduit line, said fluid first encountering one or more zigzagging labyrinth regions having a flow-restricting pressure-reducing effect, the lower-pressure fluid thereafter passing through one or more narrow trickle channels within the flexible pressure-sensitive transversal member, the exterior portion of which is exposed to the higher pressure of the fluid in the conduit line, the trickle channels therein having a variable restrictive effect on the fluid flow therethrough in conformity with the difference between the pressure of the fluid in the conduit line and the pressure of the fluid passing into the trickle channels within the transversal member, the fluid then flowing out of the transversal into a plurality of pathways which lead to a plurality of annular output regions on either end of the emitter having a plurality of annular support ribs therein, each rib having a one or more gaps therein at the same region so as to provide a direct path for the free flow of fluid across the annular output regions to two or more output orifices in the conduit line allowing the fluid to escape to the outside environment.

The flow from the outlet openings is predetermined by the size and shape of the labyrinth, the properties of the material comprising the emitter, the thickness of the walls of the transversal member, the contours of confronting parts of the trickle channel within the transversal member, and the number of trickle channels within the transversal member. The restricted size of the trickle channels within the transversal member depend on several factors, including, but not limited to, the physical properties of the elastomeric material comprising the emitter. Highly flexible soft material having low shore hardness will form a smaller passage in the trickle channels than a material having greater shore hardness. The wall thickness of the transversal member will also affect its ability to collapse under fluid system pressure. By proper coordination of all of the above parameters, a virtually constant flow condition is feasible.

What is claimed is:

1. A conduit line having a cylindrical one-piece in-line pressure compensating drip irrigation emitter unit disposed therein, said emitter unit comprising:
    (a) An emitter body of flexible elastic material having a plurality of inlet means in communication with the interior of the conduit line for transferring fluid under pressure therefrom;
    (b) Deformable flow regulating means including a tubular member diametrically traversing the cylinder of said irrigation emitter unit, and interposed between said inlet means and a plurality of annular output regions for regulating the volume of fluid flowing therebetween, said tubular member being adapted to be deformed by greater fluid pressure in the conduit line to restrict the flow of fluid therethrough; and
    wherein said plurality of annular output regions are coupled to said tubular member, each having a plurality of gapped support ribs therein for providing a direct path for the free flow of fluid from said tubular member across said annular output regions to the exterior of the conduit line through a plurality of output orifices cut into the conduit line immediately adjacent to said annular output regions, whereby changes in fluid pressure in the conduit line inversely affect fluid flow through said tubular member, so that output fluid flow rates tend to remain relatively stable.

2. The conduit line and emitter unit as defined in claim 1 wherein said deformable flow regulating means is comprised of at least one pressure-sensitive channel axially located across the central diameter of the emitter cylinder.

3. The conduit line and emitter unit as defined in claim 1 wherein the interior of said deformable flow regulating means is comprised of an irregular surface which defines at least one narrow trickle channel through which fluid may flow intermediate said inlet means and said output regions.

4. The conduit line and emitter unit as defined in claim 1 wherein the internal diameter of the emitter unit and the internal diameter of the conduit line are about the same.

5. The conduit line and emitter unit as defined in claim 4 wherein said conduit line has a continuous outside surface and a continuous inside surface for conducting fluid.

6. The conduit line and emitter unit as defined in claim 13 wherein said conduit line includes a first section which forms a tube-like housing, said emitter unit being disposed within said tube-like housing, and wherein one end of said tube-like housing is adapted to be connected into a second section of said conduit line, and the other end of said tube-like housing, which is closable by a lid-like cover, is adapted to be connected into a third section of said conduit line.

7. The conduit line and emitter unit as defined in claim 6, wherein said lid-like cover has a rim and at least part of the rim of said lid-like cover serves as a guard shield for said output orifice in the conduit.

8. A drip line comprising:

(a) A tubular fluid-carrying conduit line;
(b) A plurality of emitter units, each emitter unit comprising:

an emitter body of flexible elastic material having a plurality of inlet means in communication with the interior of the conduit line for transferring fluid under pressure therefrom;

deformable flow regulating means including a tubular member diametrically traversing the cylinder of said irrigation emitte runit, and interposed between said inlet means and a plurality of annular output regions for regulating the volume of fluid flowing therebetween, said tubular member being adapted to be deformed by greater fluid pressure in the conduit line to restrict the flow of fluid therethrough;

and wherein said plurality of annular output regions are coupled to said tubular member, each having a plurality of gapped support ribs therein for providing a direct path for the free flow of fluid from said tubular member across said annular output regions to the exterior of the conduit line through a plurality of output orifices cut into the conduit line immediately adjacent to said annular output regions, whereby changes in fluid pressure in the conduit line inversely affect fluid flow through said tubular member, so that output fluid flow rates tend to remain relatively stable, and wherein said units are internally disposed at predetermined spaced intervals within said tubular fluid-carrying conduit line which forms an outer sleeve around said emitter units, said line communicating with the outside via a plurality of wall orifices provided therein adjacent said emitter output regions.

9. The drip line as defined in claim 8 wherein the exterior circumferential area of the conduit line is increased in the vicinity immediately adjacent to the emitter units so as to allow a larger diameter in the region of said emitter units to accommodate said units.

* * * * *

UNITED STATES PATENT AND TRADEMARK OFFICE
CERTIFICATE OF CORRECTION

PATENT NO.  : 4,824,025

DATED       : April 25, 1989

INVENTOR(S) : David B. Miller

It is certified that error appears in the above-identified patent and that said Letters Patent is hereby corrected as shown below:

Column 9, line 28 the claim reference numeral "13" should read --1--.

Signed and Sealed this

Ninth Day of January, 1990

*Attest:*

JEFFREY M. SAMUELS

*Attesting Officer*   *Acting Commissioner of Patents and Trademarks*